United States Patent [19]

Tseng

[11] Patent Number: 4,620,514
[45] Date of Patent: Nov. 4, 1986

[54] INTERNAL COMBUSTION ROTARY POWER PLANT SYSTEM

[76] Inventor: Ching-Ho Tseng, #82, Chung-Shan North Road, Section One, 11th Floor, Taipei, Taiwan

[21] Appl. No.: 646,448

[22] Filed: Aug. 31, 1984

Related U.S. Application Data

[63] Continuation-in-part of Ser. No. 160,628, Jun. 18, 1980, abandoned.

[51] Int. Cl.$^4$ ............................................. F02B 53/08
[52] U.S. Cl. .................... 123/202; 123/213; 123/237; 251/333; 251/356; 464/66; 464/69; 464/76
[58] Field of Search ............... 123/202, 213, 234, 235, 123/236, 237, 238; 251/333, 325, 356; 417/310, 440

[56] References Cited

U.S. PATENT DOCUMENTS

| | | | |
|---|---|---|---|
| 1,147,428 | 7/1915 | Peterson | 123/238 X |
| 1,184,650 | 5/1916 | Ingraham | 123/238 |
| 1,568,053 | 1/1926 | Bullington | 123/202 |
| 2,583,633 | 1/1952 | Cronin | 123/237 X |

FOREIGN PATENT DOCUMENTS

740962 11/1955 United Kingdom ................ 123/213

*Primary Examiner*—Michael Koczo
*Attorney, Agent, or Firm*—John F. McClellan, Sr.

[57] ABSTRACT

An internal combustion power plant system provides a rotary engine and a rotary fuel/air mixture compressor for the rotary engine on a common driveshaft, coaxially mounting each end and supported between them by a gearbox which synchronizes operation of various ignition and valve and abutment components of the system; compressed fuel/air mixture is supplied to and ignited in a valve-isolated manifold chamber in the rotary engine in successive charges following which each ignited charge is valved radially into one of plural expanding chambers defined by the rotary engine rotor and abutment mechanism, where it urges rotation of the rotor and then exhausts radially; in preferred embodiment the exhaust actuates a parallel fuel-feed which booster pumps fuel/air mixture into the manifold chamber; detail improvements disclosed include designs of runners, abutments, valving and rotary compressor mechanism.

8 Claims, 20 Drawing Figures

INTERNAL COMBUSTION ROTARY POWER PLANT SYSTEM

CROSS-REFERENCE TO RELATED APPLICATION

Cross-reference is made to my copending application for U.S. patent, Ser. No. 160,628, filed 6-18-80, now abandoned, for INTERNAL COMBUSTION ROTARY POWER PLANT SYSTEM, of which this application is a continuation-in-part.

FIELD OF THE INVENTION

This invention relates generally to internal combustion rotary power plants and particularly to co-acting improvements of various parts of such power plants.

BACKGROUND OF THE INVENTION

My copending application referred to above and my U.S. Pat. Nos. 4,424,779, Jan. 10, 1984; 4,444,164, April 24, 1984; 4,444,165, April 24, 1984 and 4,448,161, May 15, 1984 disclose a system of the type described having a rotary engine and a rotary fuel/air mixture compressor for the rotary engine on a common driveshaft, coaxially mounting each end and supported between them by a gearbox which synchronizes operation of various ignition and valve and abutment components of the system; compressed fuel/air mixture is supplied to and ignited in a valve-isolated manifold chamber in the rotary engine in successive charges following which each ignited charge is valved radially into one of a plurality of expanding chambers defined by the rotary engine rotor and abutment mechanism, where it urges rotation of the rotor and then exhausts radially; in preferred embodiment the exhaust actuates a parallel fuel-feed which booster pumps fuel/air mixture into the manifold chamber; detail improvements disclosed include designs of runners, abutments, valving and rotary compressor mechanism.

The disclosure of my above referenced U.S. Pat. No. 4,424,779 is incorporated and made a part hereof.

SUMMARY OF THE INVENTION

The rotational speed of such compressor or furnish plants with configurations similar to power plants with which they share the same shaft is equal to that of the power plants, and highest right after each explosion of fuel, decreasing to lower more uniform speed afer this stage. Peaks of acceleration are hard on both driving and driven mechanisms. The present invention addresses this problem by several co-acting means simultaneously, including a torsional damping system, a family of special, curved rotor surfaces that reduces surface speed of slide or abutment relative to rotor followed by it, to provide more even speed of sliding, combined with greater volume swept and higher compression ratio; adjustment of compression by novel, air relief valves to permit a driver of a vehicle, for example, to adjust air-fuel ratio during running stages (cool or hot engine, high or low gear or speed) and by other means.

A principal object of the rotary power plant system of my present invention is therefore to provide co-acting means for controlling operation so as to smooth and refine the cyclical operation at all points.

Further objects are to provide a system as described in which a plurality of subsystems serve to damp-out transients, and in which a novel control is achieved by control of an adjustable-valve first compressor in a two-stage compression system.

Still further objects are to provide a system as described in which said adjustable valve itself is of novel design providing special efficiency for the control purpose for which it is used, and in which a new design of compressor rotor contributes to the overall smoothness achieved by the system.

Yet further objects are to provide a co-acting shaft-transmission coupling and fuel system that smooth-out power impulses transmitted from engine to load and to compressor system.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

The following descriptions of advantages, structure, mechanism and function are further objects of the invention.

Figure 1:
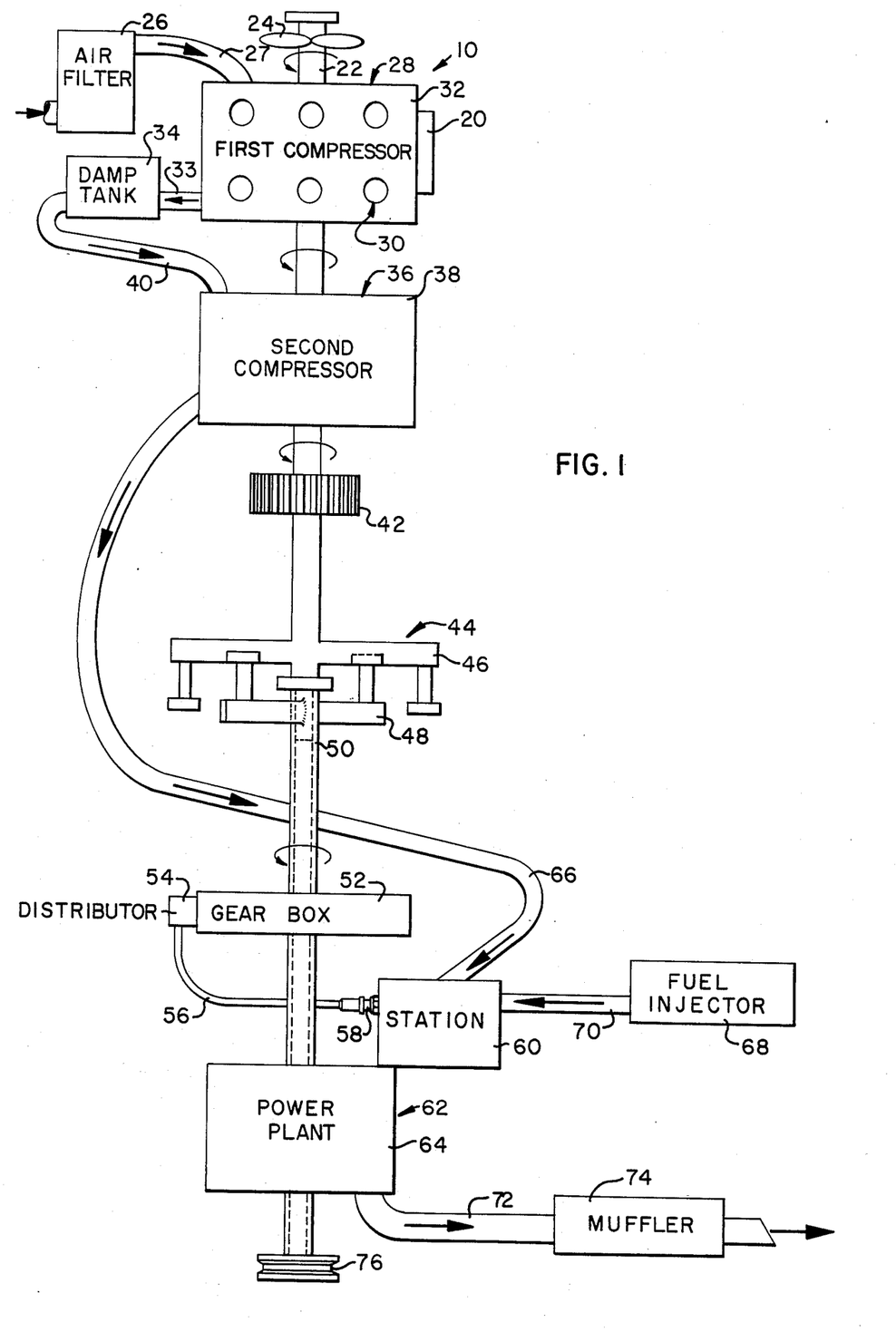
FIG. 1 is a schematic diagram of the relation of elements in the system of this invention.

FIG. 1 schematically diagrams relations of elements of the invention, in embodiment 10. Each of the fixed elements may have a base, 20 shown, or other mounting holding it in place. On a first rotating shaft (or furnish plant shaft or rotary compressor shaft) 22, at the first end, a fan 24 mounted on the shaft blows air over the fixed components to be described, serving two functions, as a surge damper for smoother operation, and as a cooler, to preserve a more uniform operating temperature for smoother operation.

Ambient air, arrow at air filter 26, is drawn through the air filter and line 27 into first compressor 28, the housing of which is shown, and which has a rotor in the housing that is driven by the shaft 22. Air-relief means in the form of one or more valves 30 through the housing 32 adjust fuel/air ratio fed to the engine during different running stages: cool engine, hot engine, low speed, high speed, low load, high load, and to even flow of air in the compressor, particularly under light loads, for smoother operation. Air from the first compressor through line or lines 33 enters a damp tank 34 or water deposit tank or water removal tank where much of the water in the air deposits, so that operation of the system does not become rough through waterlogging.

From the damp tank 34 the drier air enters the second compressor 36 which is similar to the first, with a rotor driven by the shaft 22, but is without the valves through the housing 38. The second compressor receives compressed air from the first compressor through first conduit 40 and boosts the air pressure but in a more uniform manner than if all compression were done in one stage with one rotor, for smoother operation.

On shaft 22, preferably between the second compressor 36 and the accommodating-joint or torsional damping joint to be described, it is provided a gear 42 as a power take-off. A spur gear is shown, but any other suitable form of gear or pulley may be used. Engine surges may be better damped at this location as opposed to a location on the opposite side of the accommodating joint, and power take-off is more uniform.

The accommodating joint 44 has two relatively movable motion-damping elements, cross-arm element 46 on shaft 22, and, axially facing it, cross-arm element 48 on second tubular shaft or power plant shaft 50 that fits coaxially over shaft 22. As will be seen, elements 46, 48 are connected by two types of resilient shock-absorbers not shown in this diagram, that permit limited relative motion of the first and second shafts, to damp out torsional vibration between the shafting elements 22, 50.

Gearbox 52 serves to support the shaft 50, which runs through it, and to synchronize ignition by means of distributor 54 and appropriate wiring 56 and spark plugs, 58 shown, mounted in manifold 60. Synchronization is preserved better by mounting the synchronizing system on the shaft with the rotary power plant.

Rotary internal combustion power plant or engine 62 has within the housing 64 a rotor fixed to shaft 50 and by this means the shaft 50 is driven.

Fuel-air mixing for power plant or rotary internal combustion engine may occur at station or manifold 60 where compressed air from the second compressor 36 is fed through second conduit 66 to manifold 60 where fuel is injected by fuel injector 68 through line 70.

In the manifold, in the synchronized operation described in my U.S. Pat. No. 4,424,779 the fuel-air mixture is ignited and released into the expansion chambers formed between engine housing and rotor.

Exhaust gasses pass through pipe 72 and muffler 74.

A power take-off pulley 76 is provided on the free end of shaft 50, giving an optional load connection that can help in balancing loads for greater smoothness of operation.

Figure 2:
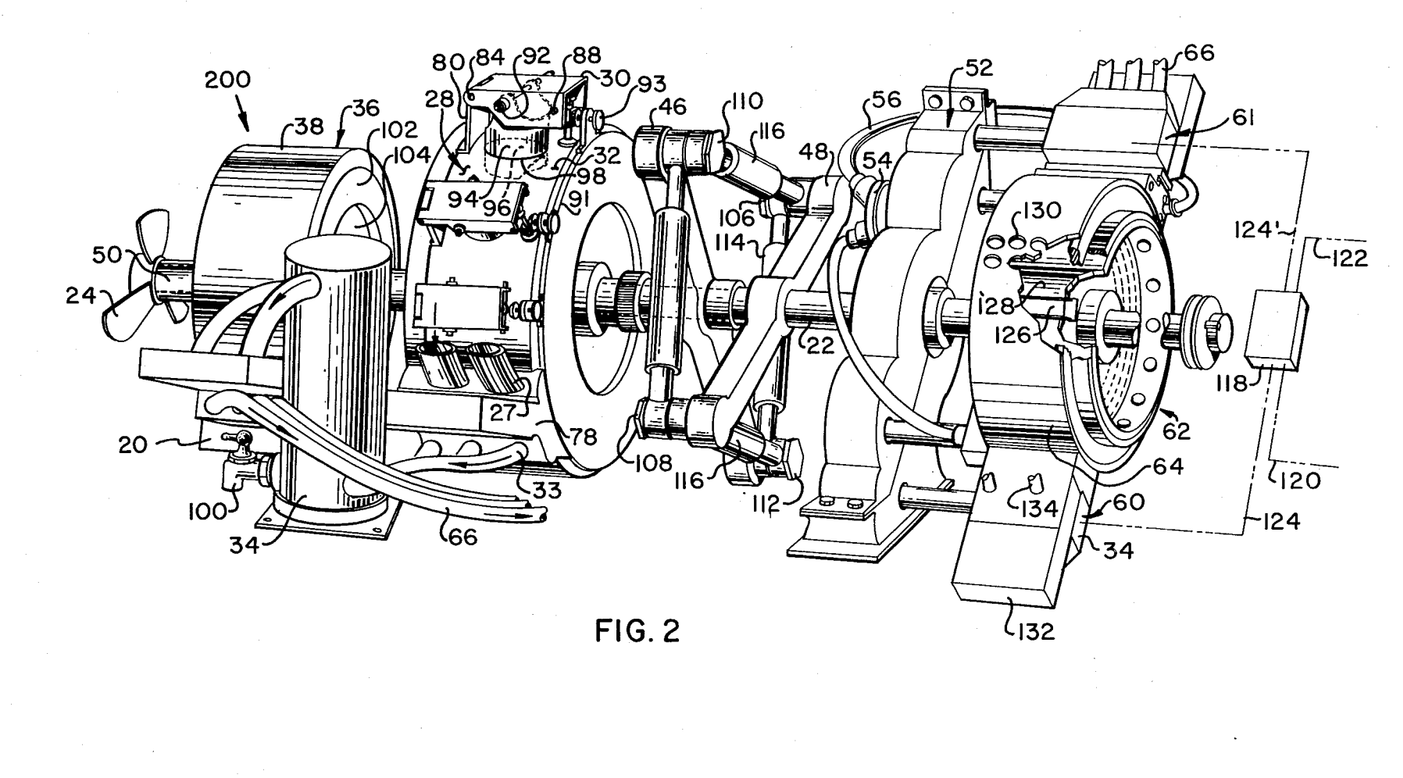
FIG. 2 is a perspective view partly fragmentary of the preferred embodiment.

FIG. 2 diagrams the above-described components in perspective view in a preferred embodiment 200, similar in arrangement to the FIG. 1 arrangement except that the first compressor 28 may have fewer or more valves and may be mounted inboard of the second compressor 36. It may require less cooling; and the shafts 22 and 50 are reversed in location. These changes show versatility in the system.

FAN

Fan 24 may be shrouded and of any suitable conventional configuration for thrusting air past the compressors, and also serves as a torsional damper.

FIRST COMPRESSOR

Air from the air filter (not shown) is drawn through a conduit or conduits as at 27 into the first furnish plant or first rotary compressor 28 adjacent each abutment housing 78, of which preferably there are three. The air is then compressed between the rotor in the compressor and the compressor abutment mechanism and interior walls, and is ejected as first-stage compressed air through one or more conduits 33.

In this first compressor, one and preferably several circumferentially-spaced air-relief or venting, or compression-adjustment relief valving means as at 30, may be provided. Each may include at a first end a fulcrum 80 fixed upright to the compressor housing 32, a lever 82 with pivotal connection 84 to a first end of a fulcrum, a lever-pivoting mechanism 86 with pivotal connection 88 to the second end of the fulcrum, actuation connection for the lever-pivoting mechanism which may include a rack 91 for simultaneously actuating all pinions 93 together and a central pivot rod 92 on the lever slidably engaged wtih a valve-body 94 with closed, stepped, inward face 96 for adjustably closing a half-disc shaped valve opening 98 in the periphery of the first compressor housing. This mechanism is described in more detail later.

DAMP TANK

Compressed air from the first compressor enters the bottom of a known, preferably upright cylindrical, damp tank 34, with inlet pipe at bottom and outlet pipe at top, effectively, where water removed from the air in the turbulence may be drained off, through a valve 100.

SECOND COMPRESSOR

Relatively drier air ejects from the damp tank 34 at the top through one or more conduits and enters second furnish plant or second rotary compressor 36, like the first a cylindrical housing 38 with annular end flanges 102 engaging a rotor 104 mounted in it on first shaft 50.

Any conventional base, indicated at 20, may be used to help support the housings of the compressors, as necessary. From the second compressor 36, which preferably is like the first except that it may have no air relief valve provisions, air passes through one or more conduits 66 to two diametrically opposed stations or manifolds 60, 61 spaced around the housing 64 of the engine 62.

ACCOMMODATING JOINT 44

Pinned or keyed centrally to shafts 50, 22 are respective first and second cross-arm elements 46, 48 each with a journal at each end, 106, 108 and 110, 112 respectively. The journals extend parallel toward the other cross arm, all journals lying in a circle centered on the shaft axis.

Extending between journal 110 of the first cross arm 46 and journal 108 of the second cross arm 48 on respective bearings is a first-type resilient shock-absorber mechanism 114, a press-to-actuate piston mechanism.

Similarly extending between journal 110 of the first cross arm 46 and journal 106 of the second cross arm 48 is a second-type resilient shock-absorber mechanism 116, a draw-to-actuate mechanism.

Continuing around the circle, journals 106 and 112 are connected by a press-to-actuate mechanism 114 and journals 108 and 112 by a draw-to-actuate mechanism 116.

For better damping operation, two of the journals are closer than the other two around the circle, as will be seen.

GEARBOX

Gearbox 52 rests on the deck and supports shaft 22 and the engine 62. Stub shafts attached to gearing in the gearbox actuate the abutments and the valve in the engine housing at the stations 60, 61, as indicated in my previously mentioned U.S. Pat. No. 4,424,779, and ignition system, including distributor 54, wires 56 shown, and spark plugs 58, shown, similarly operates as set out in that patent.

ENGINE

Power plant or rotary internal combustion engine 62 operates as described in my aforesaid U.S. patent. In the present system, however, a fuel injector, diagrammed at 118, of any suitable conventional type, such as those in automotive use, is preferred for smooth operation to the carburetor described in my aforesaid U.S. patent. However, the carburetor arrangement may be used, if desired. The fuel injector may be run continuously and electrically, as by a cable 120; fuel may be drawn in by the injector through tubing 122 and ejected through high pressure tubing 124, 124'. No synchronization may be required, the charge building up in the manifold, ignited and admitted into the engine through valves described in my said U.S. patent, as will be seen.

The air relief system in the first compressor exercises control over amount supplied and so may govern engine operation.

Alternatively, the fuel injection may be synchronously metered into the pre-firing valve chamber described in my said patent. If synchronization is required, a conventional synchronizing cam and breaker points may be placed on the shaft 22 and the fuel injector valved to inject fuel in time with the rotation of the shaft.

Visible in FIG. 2 are a runner 126 on the rotor 128, exhaust openings 130 that may be connected to an exhaust pipe by an ordinary manifold affixed to the engine housing 64, abutment housing 132 and lubrication/coolant lines 134.

Figures 3, 4A:
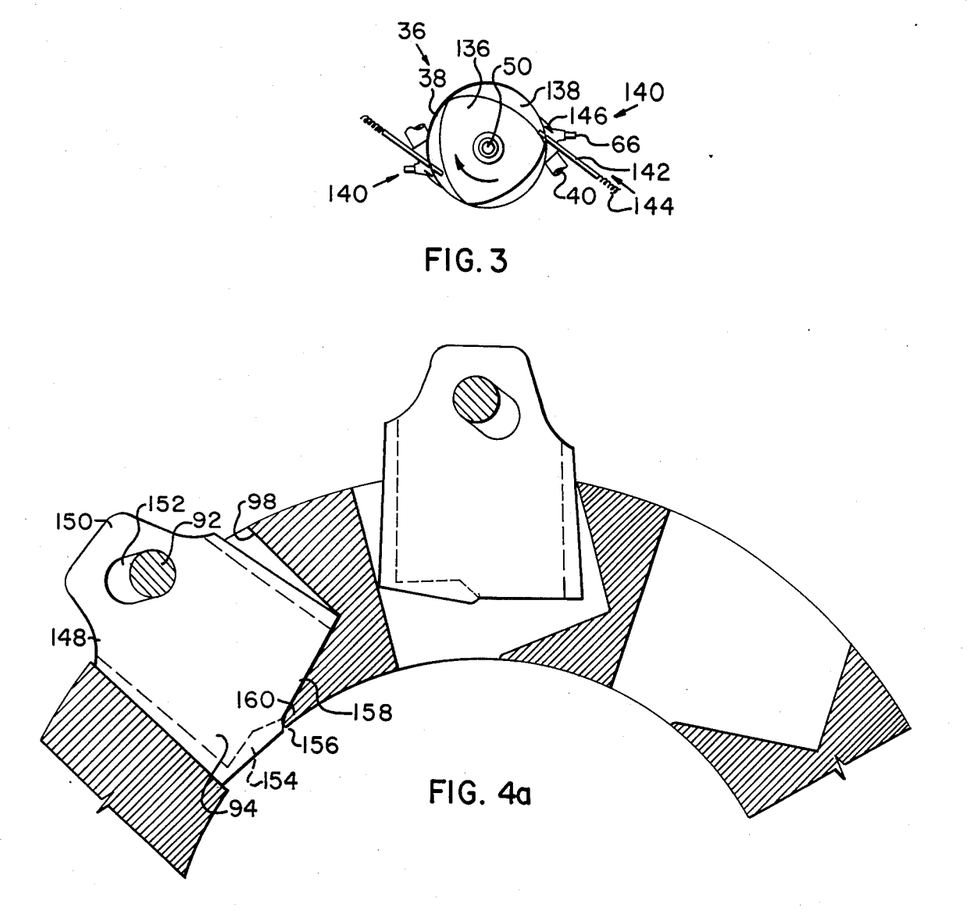
FIG. 3 is an axial-view, partly broken-away diagram, showing known-art compressor mechanism.
FIG. 4a is a partly sectional fragmentary, elevational detail showing a second embodiment of a valve mechanism; a successive position is shown for a successive such valve, for exposition.

FIG. 3 diagrams mechanism of the second compressor 36, according to the strucural details shown in my said U.S. Pat. No. 4,424,779. Except for the relief valve detail, the first compressor is similar.

Compressor rotor 136 comprises in axial view generally an equilateral three-sided shape with convex faces, symmetrically mounted on the driveshaft 50. The housing 38 forms a cylindrical chamber 138 coaxial with the rotor 136. The two compressor stations 140 are disposed in diametrical opposition in the housing.

Each compressor station includes: air inlet at 40 and exhaust at 66, separated by abutment 142 that slides in and out at an oblique angle, sealing against the compressor housing sides and the rotor periphery. A suitable spring 144, that may be a compression spring in the abutment housing, not shown, biases the abutment in, and a check valve 146 in the exhaust can be used to prevent backflow. The curved arrow indicates rotation.

FIG. 4a is a partly sectional, fragmentary diagram of the novel air relief valve mechanism in the first compressor (the entire mechanism being like that of FIG. 2 but turned 90° in the compressor housing 32 and having no rack. The FIG. 2 embodiment is described later.)

Each valve body 94 is cuplike in shape, with conical-walls narrowing toward the cut-away open top 148 where on opposite sides, cut-away portions rise up as ears, 150 shown, with respective aligned slots, 152 shown, inclined at an angle to the axis.

The bottom is a closed flat over half the bottom area or half-disc 154 and is stepped up at an angle at the line of dichotomy or ledge 156 and has a half-disk-like opening over the other half of the bottom area, as at 158. The bottom stepped-up open area fits as a seal around the perimeter thereof, including along a half disk-like closed portion edge or ledge 160 in the housing bore or cylinder 98. Lever rod 92 holds the valve body down tight, or when adjusted, permits the valve body to tip about a transverse axis in the cylinder and air to escape around the valve bottom. The weight of the valve body can seal it when the compressor is not in action, sealing out dust. The taper of the valve body provides freedom to tip in the cylinder, as well as the cut-away side shape of the ears 150, and the incline of the slots 152 to the cylinder axis aids the tip and helps seat the body.

Figure 4B:
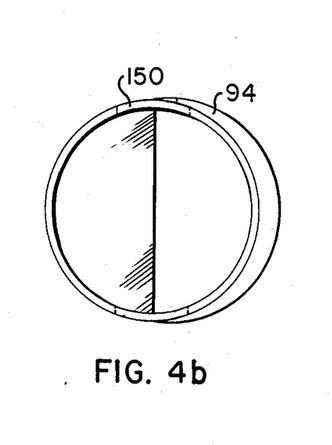
FIG. 4b is a top plan view thereof.
Figure 4C:
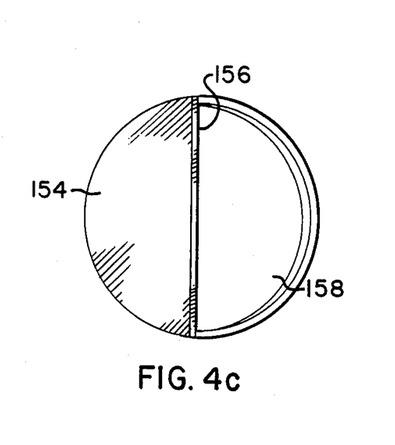
FIG. 4c is a bottom plan view thereof.

FIG. 4b shows, in top plan view, the valve body 94 and ears 150 and FIG. 4c shows the bottom plan view. If desired, for better seal, an elastomeric compound such as rubber can be used to cover the valve body and/or seat.

The ledge 156 is parallel with the lever rod 92. This new design is suited for adjustment to meter out precisely small amounts of air or to spill large amounts quickly, depending on adjustment.

Figure 5:
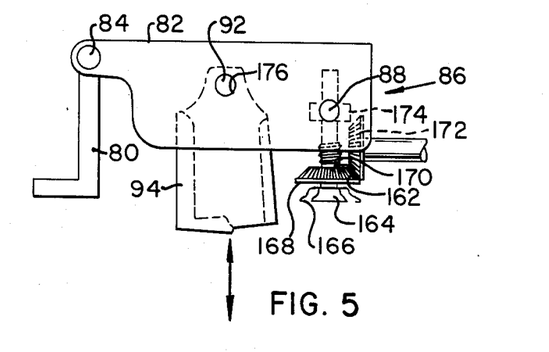
FIG. 5 is an elevational detail of a first or preferred embodiment valve.
Figure 6:
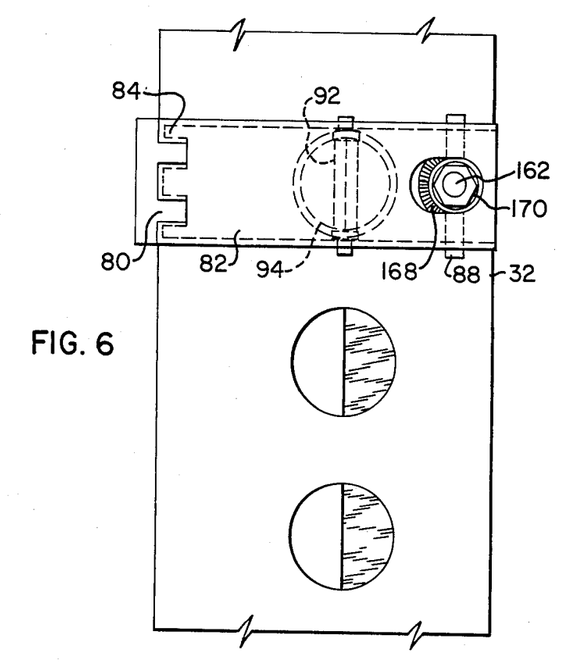
FIG. 6 shows the plan view of the FIG. 5 embodiment.

FIG. 5 and 6 further detail novel valve mechanism similar to that of FIG. 4a, except that the entire mechanism is turned 90° from it, being oriented as shown in FIG. 2, which shows this first embodiment.

Pivot 84 connects fulcrum 80 to a first end of lever 82 which carries lever rod 92 for lifting or lowering valve body 94 according to rotation of the radial-adjustment shaft 162 of lever pivoting screw mechanism 86 at a second end of the lever, as follows. Base 164 of the radial adjustment shaft is flexibly and rotatably but tightly held against the compressor housing 32 of the first compressor (FIG. 2) by a clip 166, which may be screwed to the compressor housing.

The radial adjustment shaft 162 may have on it two gears, inner 168 and outer 170. The inner gear 168 may be a bevel gear adjustably rotated by a second bevel gear 172, turned by hand or automatically adjusted in accordance with some operating parameter, such as speed of revolution of the shaft 22, in accordance with well known practice obvious to those skilled in the art.

The outer gear 170 may engage a nut 174 pivotally held to the lever 82 by a rod 88, so that the rotary position of the radial adjustment rod determines the radial position of the lever 82, and those of the valve body 94, which hangs from lever rod 92, pivoted to the lever arm at 176. The "U"-section shape of the lever arm provides for mounting the valve body and radial-adjustment shaft nut pivotally, and stiffens and strengthens this sub-assembly.

Figure 7:
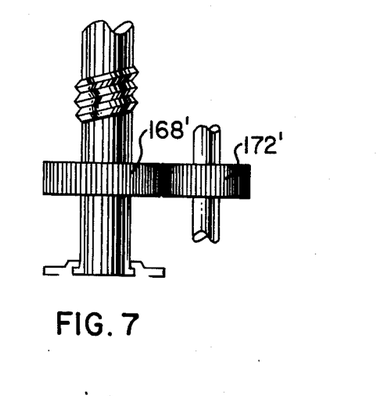
FIG. 7 is a fragmentary detail of a variation, otherwise like that of FIG. 5.

FIG. 7 is a detail showing that the radial-adjustment shaft can be equipped with a spur gear 168' for adjustment by another spur gear 172'.

Figure 8:
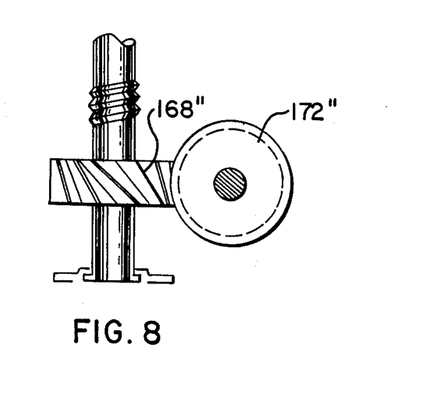
FIG. 8 is a fragmentary detail of a further variation, otherwise like that of FIG. 5.

FIG. 8 shows the use of worm type gears 168", 172" for the purpose. Mechanical advantage may preferably be such that the gear 172" holds the position to which set.

Figure 9:
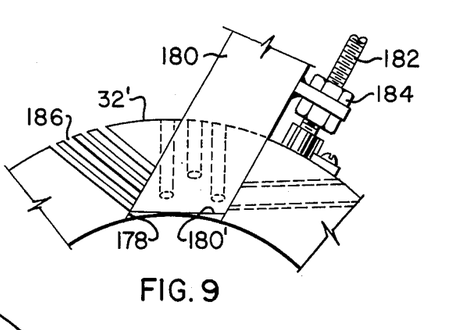
FIG. 9 is a sectional detail of an alternative or third valve embodiment.

FIG. 9 shows an alternative embodiment that can be used for the air relief valves.

Circular section cylinder or piston-bore 178 is shown at an angle to the radial direction of the compressor housing 32' although it can be radial. Piston 180 fits in it and may be adjusted by conventional screw and nut adjustment 182, 184 fixed to the housing with screws, or by the same type mechanism described above for the first valve embodiment. The bottom 180' of the piston is angled as shown so as to conform closely to the shape of the housing 32' but the stroke is limited so that the piston will not protrude into the housing.

At least one, and preferably a conical array of sub-bores or vents 186 intersects the piston bore 178 at an inclined angled relative to it. As the piston 180 retracts it uncovers progressively one or more of the vents 186, giving the desired air relief to suit the application.

Figure 10:
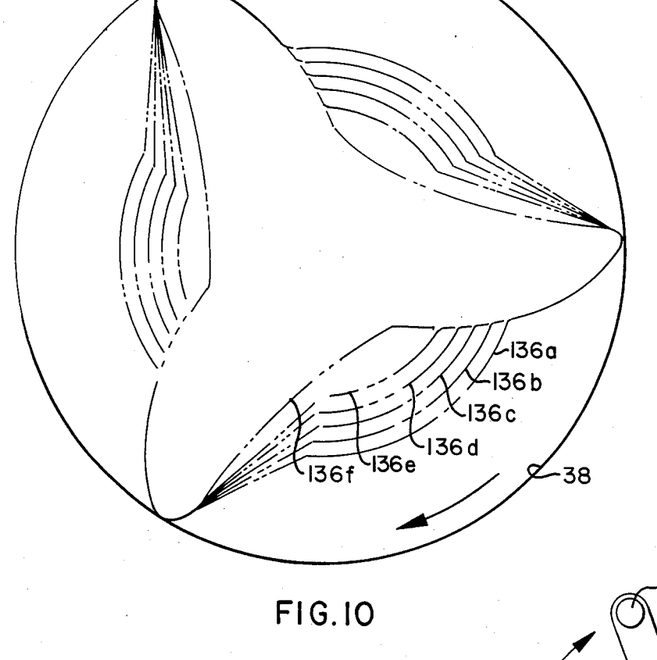
FIG. 10 shows a family of curves for novel rotor mechanism for either stage of the compressor system of this invention.

FIG. 10 shows, in axial view, variations in shape for the rotor of either compressor. These can help provide more uniform rotation, larger swept volume, and may be described as "non-single" or plural curvature surface curves. Following this family of curves for rotors, special-purpose compressor performance can be produced by one skilled in the art to meet various performance requirements. Such a need might, for example, be to reduce abutment in/out velocity over portions of the rotation, and to speed it elsewhere. Rotation may be in the direction of the curved arrow; housing wall at 38, and the abutments and other details may be as in FIG. 3. It will be evident that the outermost of these curves, 136a, provides for a fairly gradual inward abutment motion followed by a relatively long constant-displacement portion, succeeded by outward displacement more rapid than the initial inward displacement, and a more gradual turnaround curve in the greatest-radius region than that of lobed rotor 136 in FIG. 3.

The succeeding curves 136b, 136c, 136d, 136e, produce progressively more rapid abutment inward motion, greater area displacement during rotation on the average, less constant-displacement time, and more accelerated outward motion but all with the same gradual turnaround curve in the greatest-radius region.

Finally, the innermost curve 136f, being entirely concave, provides the greatest average displacement and abutment velocity and no constant-radius curve at all, but still has the same greatest radius curvature as the others.

Figure 11:
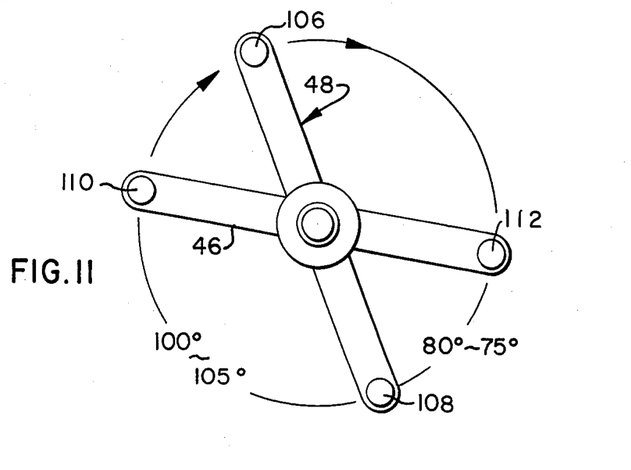
FIG. 11 is an axial diagram of action of a preferred load-evening accommodator-joint or coupling between the rotary engine, and the compressor and power take-off.

FIG. 11 diagrams the axial relation of the cross arm journals referred to in the descriptions of FIGS. 1 and 2. The circumferential spacing of journals 106 and 110 and of journals 108 and 112 is preferably about 80 to 75 degrees, the respective adjacent journals of these are to be interconnected by "draw" type shock absorbers. The remaining journals are spaced preferably about 100 to 105 degrees, and are to be connected by "press" type shock absorbers.

Figure 12:
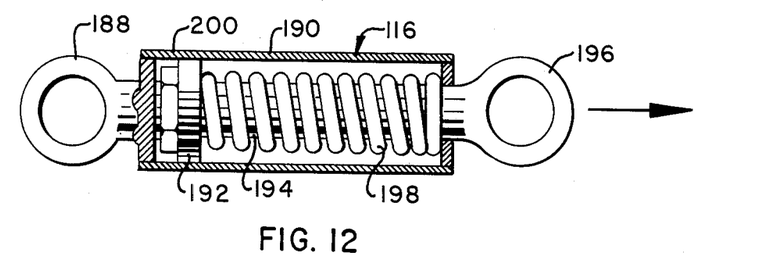
FIG. 12 is a partly sectional view of a tension type component thereof.

FIG. 12 diagrams a draw or tension type component or shock absorber 116. Bearing 188 is attached at first end of tube 190; plunger seal 192 fits interior of tube and is drawn by rod 194 and bearing 196 integral with the rod against the resilient resistance of air and of compression spring 198 captured on the rod between the lunger seal and the second end of the tube, through which the rod 194 passes. The tube may have air holes 200 to permit limited air movement for damping through energy absorption.

Figure 13:
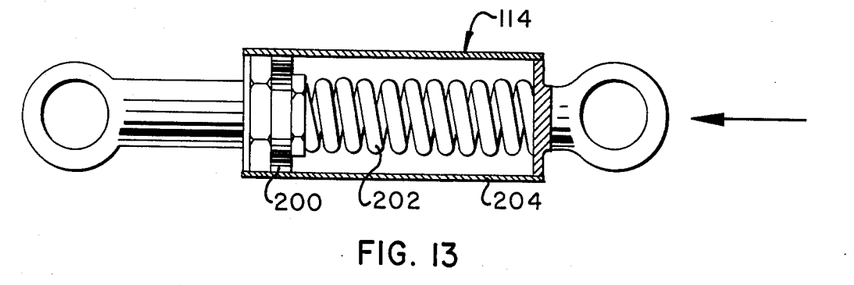
FIG. 13 is a similar view of a compression-type component thereof.

FIG. 13 diagrams a press or compression-type shock absorber 114. Action is similar to the other type but reversed. Forcing the bearings closer together moves plunger seal 200 against the force of compression spring 202 and of air compressed in the tube 204 and not able to flow fast enough to equalize quickly. The compression springs and tension springs urge the cross arms in opposite circumferential directions, in a sense.

Figures 14, 15:
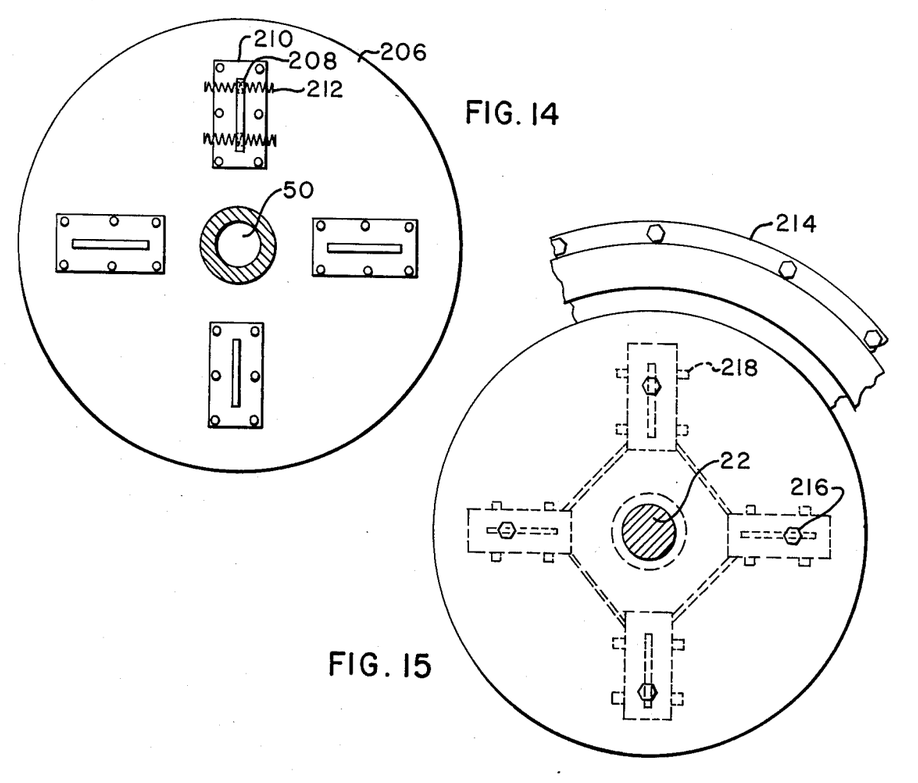
FIG. 14 is a face view of a first element of an alternative coupling.
FIG. 15 is a face view of a second said element.

FIG. 14 illustrates part of an alternative coupling that can be used, although perhaps less rugged and easy to repair, it has advantages of damping by oil shear and can support itself. It includes face-to-face first and second discs.

First disc 206 carries four plates 208 protrusive at 90° from it. These may be mounted by baseplates 210 integral with them. Each plate has associated with it four springs 212. These springs may be soldered to the plates, if desired, for easier assembly. Shaft 50, shown, passes through the disc, which is pinned or keyed to the shaft in similar manner to the cross arms described above in reference to FIG. 2.

FIG. 15 similarly shows the inner face of a second disc 214, generally like the first one and similarly affixed to the other of the two shafts, 22, but it has four recesses 216 located to receive the plates of the first disc, and in the sides of each of these, four sockets 218, for the springs to rest in. Rotational movement of the first disc relative to the second, in either direction, compresses half the springs.

Figure 16:
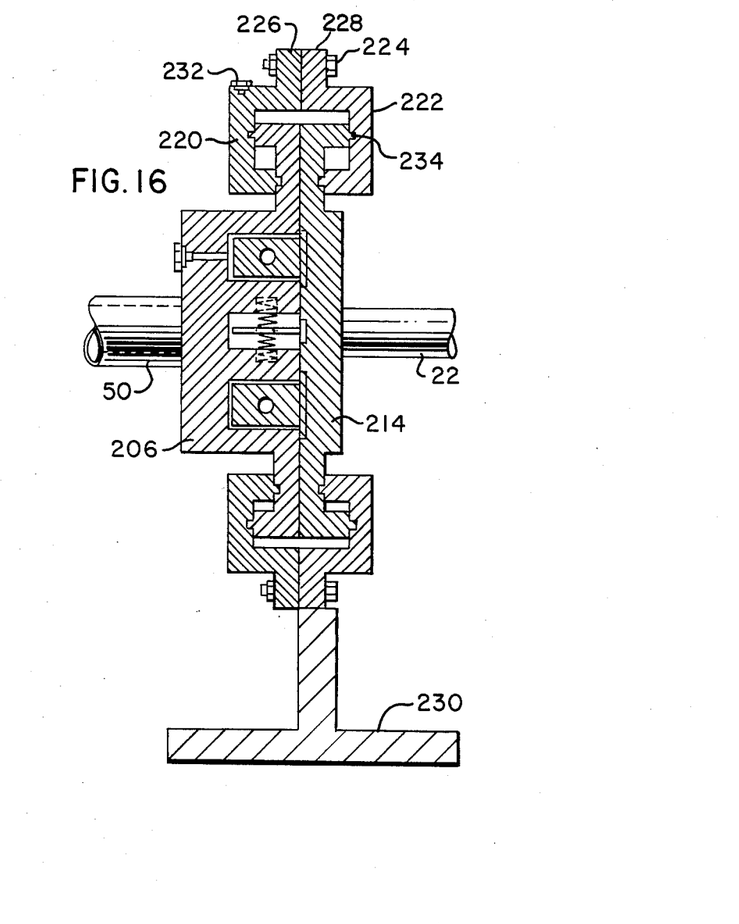
FIG. 16 is a sectional assembly diagram thereof.

FIG. 16 shows disc 206 assembled to disc 214, each fixed on one of the shafts 50, 22. Holding the disc together and in place are two ring-shaped housing members 220, 222 that clamp by bolts, 224, around circumferential flanges 226, 228 of the housing members. Base 230 integrally supports flange 228 and positions the assembly of discs and shafts and housing members. Damping may be furthered by oil or grease introduced at fitting 232 as means to produce shearing resistance of the lubricant films at areas of relative movement. Guiding and sealing thin annular flanges 234 fitting in complementary recesses may be provided.

In view of the above, it will be appreciated that the rotary compressor and torsional damper can act together backwards through the shafting as means for smoothing operation of the rotary engine, particularly with the adjustments indicated.

Figure 17A:
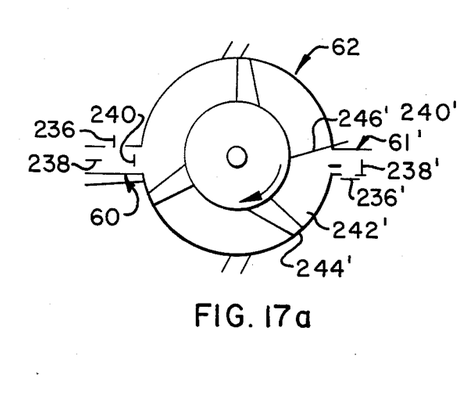
FIGS. 17a and 17b are successive position diagrams of engine operation according to the sequence disclosed in my U.S. Pat. No. 4,424,779.
Figure 17B:
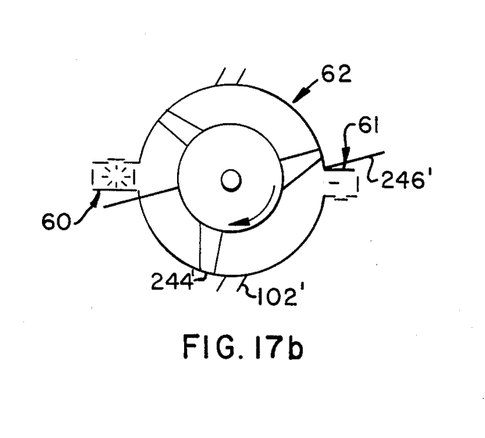

FIG. 17a and 17b diagram stages of operation of the power plant or internal combustion rotary engine 62.

In FIG. 17a, a charge of fuel and air is received in manifold 60 of one station, through valves 236 (fuel) and 238 (air) (or, if desired, fuel and air through valve 238 and valve 236 shut and not used). Valve 240 seals off the engine expanding chamber mechanism. At this time the other manifold 61 with valves 236' and 238' closed, is through valve 240' beginning a power stroke by exhausting ignited gas into the expanding chamber 242' formed between a runner 244' and abutment 246' and the housing walls.

In FIG. 17b, the charge at manifold 60 is confined by closure of all valves and the charge is ignited, whereas manifold 61 is venting through 102', with abutment 246' retracted, following which, the abutment will again extend in and form a seal as the manifold receives fuel-/air and begins a new cycle.

This invention is not to be construed as limited to the particular forms disclosed herein, since these are to be regarded as illustrative rather than restrictive. It is, therefore to be understood that the invention may be practiced within the scope of the claims otherwise than as specifically described.

What is claimed and desired to be protected by U.S. Letters Patent is:

1. In a system having cyclically operating means including:
   a rotary power plant adapted for providing power to power-take-off means,
   means for fueling the rotary power plant including rotary compressor means for supplying compressed fluid to the rotary power plant,
   means for igniting fuel during rotation of the rotary power plant,
   means for synchronizing said ignition with rotation of the rotary power plant;
   shafting axially connecting the rotary power plant, the rotary compressor means and the power-take-off means, and connecting the means for synchronizing with the rotary power plant,
   the improvement comprising:
   means for smoothing said cyclical operation of said system including:
   said shafting comprising first and second shafts coaxially disposed with a first end of each in proximate relation,
   the rotary power plant being on the second shaft,
   the rotary compressor means being on the first shaft,
   damping means connecting said first ends of the first and second shafts, said damping means permitting limited rotation of said first and second shafts relative to each other, the rotary compressor means including first and second rotary compressors, the means for smoothing further comprising the first rotary compressor having means for adjusting compression thereby, the second rotary compressor having connection for receiving compressed fluid from the first rotary compressor and further compressing fluid received from the first rotary compressor before said supplying of compressed fluid to the rotary power plant, said means for adjusting compression comprising a venting valve; a plurality of said venting valves located in spaced circumferential relation on said first rotary compressor, at least one of said venting valves having a cuplike valve body shape with a bottom having a half-disk-like bottom opening and with upward walls extending to a top opening, an ear on either side of the top opening, each ear having a respective slot, each said slot inclined to an axis of the cup-like valve body shape, a valve cylinder in the first rotary compressor, a lever rod in said slots for actuation of said valve body in the valve cylinder, the valve cylinder having a lower end with a half-disk-shaped opening therein, and the valve body having a lower end with a half-disk like closed portion for closing the half-disk-shaped opening.

2. In a system as recited in claim 1, means permitting said valve body to tip about a transverse axis in said cylinder upon said actuation.

3. In a system as recited by claim 2, the means permitting the valve body to tip including said walls being conical walls, narrowing towards said top opening.

4. In a system as recited in claim 3, the means permitting the valve body to tip further including the ears having cut-away side shape.

5. In a system as recited in claim 1, means for actuation of the lever rod, including a lever having first and second ends, a fulcrum supporting the first end, a screw mechanism adjustably supporting the second end, and means for rotating the screw mechanism.

6. In a system as recited in claim 5, the plurality of venting valves being like said at least one venting valve and each having a said means for actuation, and means for simultaneously rotating all said screw mechanisms.

7. In a system as recited in claim 5, said lever rod being transverse to said lever, and said lever being substantially parallel to said first shaft.

8. In a system as recited in claim 5, said lever rod being transverse to said lever, and said lever rod being substantially parallel to said first shaft.

* * * * *